United States Patent
Sim et al.

(10) Patent No.: US 12,513,317 B2
(45) Date of Patent: Dec. 30, 2025

(54) DEEP LEARNING-BASED METHOD FOR IMPROVING FEATURE MAP COMPRESSION EFFICIENCY

(71) Applicant: KWANGWOON UNIVERSITY INDUSTRY-ACADEMIC COLLABORATION FOUNDATION, Seoul (KR)

(72) Inventors: Dong Gyu Sim, Seoul (KR); Na Seong Kwon, Seoul (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 251 days.

(21) Appl. No.: 18/559,334

(22) PCT Filed: Dec. 28, 2022

(86) PCT No.: PCT/KR2022/021454
§ 371 (c)(1),
(2) Date: Nov. 6, 2023

(87) PCT Pub. No.: WO2023/163356
PCT Pub. Date: Aug. 31, 2023

(65) Prior Publication Data
US 2024/0244236 A1    Jul. 18, 2024

(30) Foreign Application Priority Data

Feb. 25, 2022   (KR) .................. 10-2022-0025328
Aug. 29, 2022   (KR) .................. 10-2022-0108356

(51) Int. Cl.
H04N 19/136    (2014.01)
H04N 19/184    (2014.01)
(Continued)

(52) U.S. Cl.
CPC .......... *H04N 19/30* (2014.11); *H04N 19/136* (2014.11); *H04N 19/184* (2014.11); *H04N 19/42* (2014.11)

(58) Field of Classification Search
CPC .... H04N 19/30; H04N 19/136; H04N 19/184; H04N 19/42; H04N 19/186; H04N 19/70; G06N 3/08; G06T 9/00
See application file for complete search history.

(56) References Cited

U.S. PATENT DOCUMENTS

2022/0210435 A1*  6/2022  Kang .................. H04N 19/196
2023/0262243 A1*  8/2023  Ikonin ................ H04N 19/184
                                                    382/239

FOREIGN PATENT DOCUMENTS

KR    20180131073 A    12/2018
KR    20200026026 A     3/2020

OTHER PUBLICATIONS

Kwangwoon University Industry—Academic Collaboration Foundation, ISR, PCT/KR2022/021454, Apr. 26, 2023, 10 pgs.
(Continued)

*Primary Examiner* — Juan M Guillermety
(74) *Attorney, Agent, or Firm* — Morgan, Lewis & Bockius LLP

(57) ABSTRACT

The present disclosure may be a deep learning-based method for improving feature map compression efficiency, wherein feature maps can be selectively transmitted from an encoder, and untransmitted feature maps can be predicted and generated after restoring the image quality of the transmitted feature maps using a deep neural network.

11 Claims, 2 Drawing Sheets

(51) Int. Cl.
*H04N 19/30* (2014.01)
*H04N 19/42* (2014.01)

(56) References Cited

OTHER PUBLICATIONS

Guo et al., "Deep Scalable Image Compression via Hierarchical Feature Decorrelation", 2019 Picture Coding Symposium (PCS), Nov. 2019, 7 pgs.
Park et al., "A Feature Map Compression Method for Multi-resolution Feature Map with PCA-based Transformation", Journal of Broadcast Engineering, vol. 27, Iss. 1, Jan. 2022, 15 pgs., https://koreascience.kr/article/JAKO202205351260003.page.
Park et al., "A PCA-Based Feature Map Compression Method Applied to Video Coding for Machines", Proceedings of the Korean Society of Broadcast Engineers Conference, Nov. 2021, 5 pgs., https://koreascience.kr/article/CFKO202115161225730.page.

* cited by examiner

【FIG. 1】
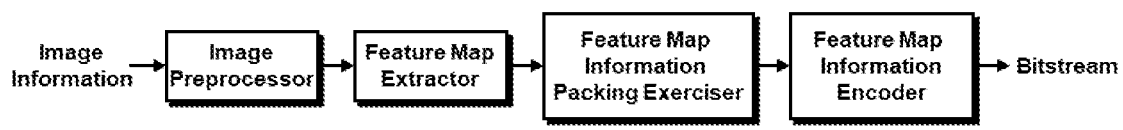
【FIG. 2】
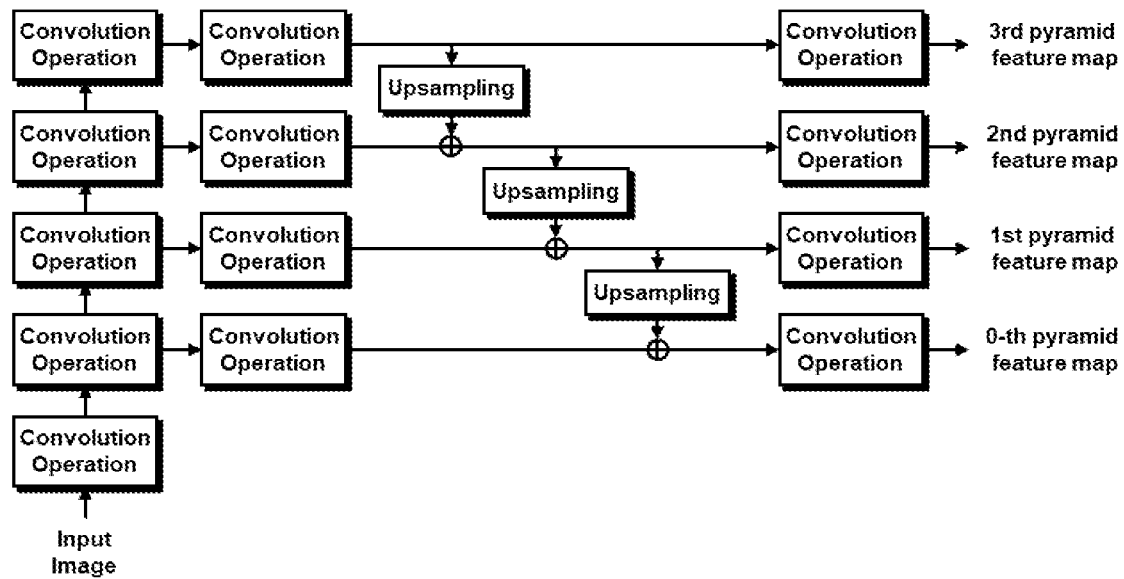
【FIG. 3】
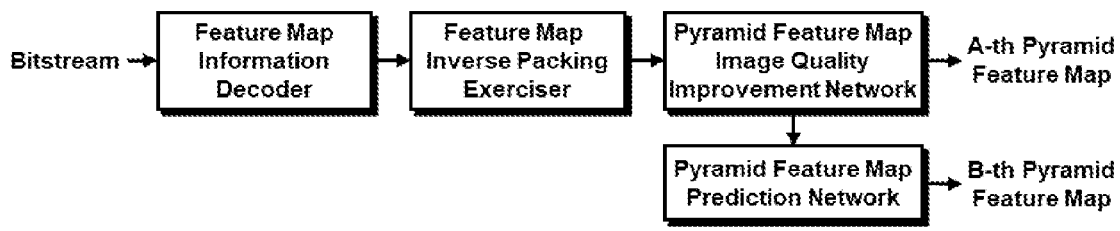

【FIG. 4】
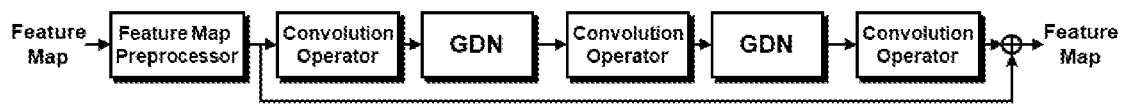
【FIG. 5】
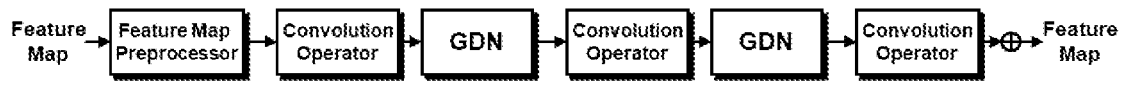
【FIG. 6】
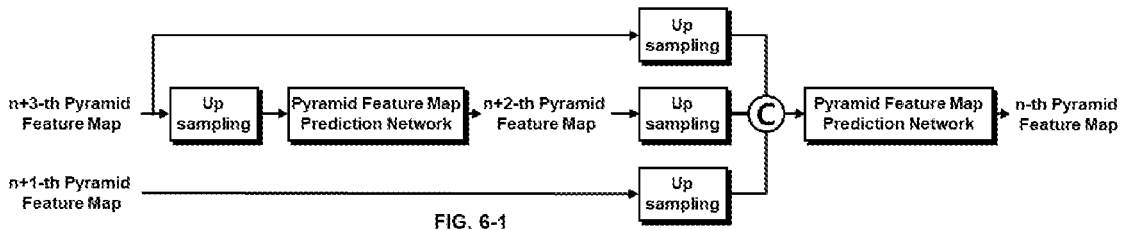
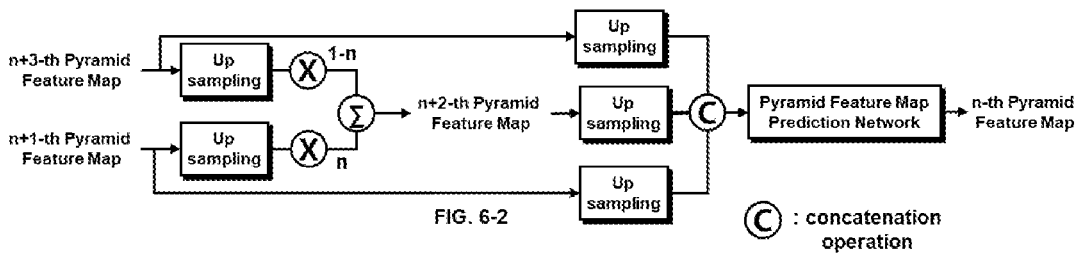

DEEP LEARNING-BASED METHOD FOR IMPROVING FEATURE MAP COMPRESSION EFFICIENCY

TECHNICAL FIELD

The present disclosure relates to a method of encoding/decoding a feature map extracted from an image, and proposes a decoding structure including a neural network which reduces compression damage generated in an encoding process and a neural network which predicts/generates a feature map which is not transmitted from a transmission edge.

BACKGROUND ART

As the industrial field to which a deep neural network using deep learning is applied has expanded, a deep neural network has increasingly applied to industrial machines. For use in application utilizing machine-to-machine communication, a compression method which takes into account not only human visual characteristics but also characteristics which are significant in a deep neural network within machines are being actively researched.

As the deep learning field has developed, study on object detection in an image is actively conducted. When object detection is performed, the same detection result is required regardless of a size of an object, so hardiness to a size of an object in an image is required. Accordingly, in order to have hardiness to a size, a feature pyramid network (FPN) structure acts as a feature extractor of a network to output a feature map of various resolutions.

As a multi-resolution feature map is output per layer for one image due to a characteristic of a feature pyramid network, the amount of data which should be transmitted to a reception edge may increase. In order to reduce the amount of data, a compression rate may be improved in an encoder, causing data damage. It may degrade performance of a machine task performed at a reception edge. Accordingly, a technology which may selectively transmit the small amount of data and a technology which reduces compression damage in a simultaneously transmitted feature map are required.

DISCLOSURE

Technical Problem

A problem according to embodiments of the present disclosure proposes a system and a method for solving the above-described problem.

In addition, a problem according to embodiments of the present disclosure proposes a method for effective transmission of a feature pyramid.

Technical Solution

The present disclosure may be a deep learning-based method for improving feature map compression efficiency. A feature map may be selectively transmitted from an encoder, and an untransmitted feature map may be predicted and generated after reconstructing image quality of a transmitted feature map by using a deep neural network.

Specifically, a neural network-based feature map decoding method and device according to the present disclosure may decode a feature map group from a bitstream, perform inverse packing for the feature map group to obtain remaining feature maps, generate a skipped feature map based on at least one feature map among the remaining feature maps, and reconstruct a final feature map based on the remaining feature maps and the skipped feature map.

In a neural network-based feature map decoding method and device according to the present disclosure, the feature map group may include the remaining feature maps excluding a feature map that signaling is skipped.

In a neural network-based feature map decoding method and device according to the present disclosure, the skipped feature map and the remaining feature maps may have a different resolution in one hierarchical structure, respectively.

In a neural network-based feature map decoding method and device according to the present disclosure, decoding the feature map group may include decoding feature map group header information from the bitstream.

In a neural network-based feature map decoding method and device according to the present disclosure, the feature map group header information may include at least one of index information for indicating each of the remaining feature maps, channel size information of the remaining feature maps or encoder type information used for encoding of the remaining feature maps.

In a neural network-based feature map decoding method and device according to the present disclosure, the feature map group header information may further include at least one of channel number information or data arrangement method information of the remaining feature maps.

In a neural network-based feature map decoding method and device according to the present disclosure, obtaining the remaining feature maps may perform inverse packing for the feature map group by performing inverse arrangement by separating data that a feature map index is arranged and two-dimensionally packed in pre-defined order in the feature map group into a plurality of feature maps based on at least one of the channel number information or the data arrangement method information.

In a neural network-based feature map decoding method and device according to the present disclosure, the skipped feature map may be generated by performing upsampling for a feature map of an adjacent lower layer of the skipped feature map among the obtained remaining feature maps.

In a neural network-based feature map decoding method and device according to the present disclosure, generating the skipped feature map may include performing upsampling for a feature map of a lower layer adjacent to the skipped feature map among the remaining feature maps, performing downsampling for a feature map of a higher layer adjacent to the skipped feature map among the remaining feature maps and performing element-wise weighted-summation for a feature map of the upsampled adjacent lower layer and a feature map of the downsampled adjacent lower layer.

In a neural network-based feature map decoding method and device according to the present disclosure, generating the skipped feature map may be performed by using a feature map prediction network including a convolution layer and a generalized divisive normalization (GDN) layer.

In a neural network-based feature map decoding method and device according to the present disclosure, reconstructing the final feature map may include performing upsampling for each of the remaining feature maps and the skipped feature map to have the same resolution as the final feature map and performing a concatenation operation for the upsampled remaining feature maps and the upsampled skipped feature map.

In a neural network-based feature map decoding method and device according to the present disclosure, it may further include performing image quality improvement for at least one feature map among the remaining feature maps and the skipped feature map may be generated by using a feature map that the image quality improvement is performed.

In a neural network-based feature map decoding method and device according to the present disclosure, performing the image quality improvement may be performed by using a feature map image quality improvement network including a convolution layer and a generalized divisive normalization (GDN) layer.

Technical Effects

According to an embodiment of the present disclosure, data may be selectively transmitted to reduce the amount of transmitted data and improve transmission efficiency.

In addition, according to an embodiment of the present disclosure, compression damage of a feature map may be reduced.

DESCRIPTION OF DIAGRAMS

FIG. 1 is a diagram showing a feature map extraction and encoding process according to an embodiment of the present disclosure.

FIG. 2 is a diagram illustrating a feature pyramid network structure according to an embodiment of the present disclosure.

FIG. 3 is a diagram showing a feature map reconstruction process according to an embodiment of the present disclosure.

FIG. 4 is a block diagram for describing a pyramid feature map image quality improvement network according to an embodiment of the present disclosure.

FIG. 5 is a block diagram for describing a pyramid feature map prediction network according to an embodiment of the present disclosure.

FIG. 6 is a diagram illustrating a pyramid feature map prediction process according to an embodiment of the present disclosure.

BEST MODE

A neural network-based feature map decoding method of the present disclosure may include decoding a feature map group from a bitstream, wherein the feature map group includes the remaining feature maps excluding the skipped feature map that signaling is skipped and each of the skipped feature map and the remaining feature maps have a different resolution in one hierarchical structure, performing inverse packing for the decoded feature map group to obtain remaining feature maps, generating the skipped feature map based on at least one feature map among the remaining feature maps, and reconstructing a final feature map based on the remaining feature maps and the skipped feature map.

Mode

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term, and/or, includes a combination of a plurality of relative entered items or any item of a plurality of relative entered items.

When a component is referred to as being "linked" or "connected" to other component, it should be understood that it may be directly linked or connected to other component, but other component may exist in the middle. On the other hand, when a component is referred to as being "directly linked" or "directly connected" to other component, it should be understood that other component does not exist in the middle.

As a term used in this application is only used to describe a specific embodiment, it is not intended to limit the present disclosure. Expression of the singular includes expression of the plural unless it clearly has a different meaning contextually. In this application, it should be understood that a term such as "include" or "have", etc. is to designate the existence of features, numbers, steps, motions, components, parts or their combinations entered in a specification, but is not to exclude the existence or possibility of addition of one or more other features, numbers, steps, motions, components, parts or their combinations in advance.

Unless otherwise defined, all terms used herein including technical or scientific terms have the same meaning as commonly understood by a person with ordinary skill in the art to which this invention pertains. Terms as defined in a commonly used dictionary should be interpreted as having the meaning consistent with the meaning in the context of the related technology, and unless explicitly defined in this application, they should not be interpreted in an ideal or excessively formal sense.

Hereinafter, in reference to attached drawings, a desirable embodiment of the present disclosure is described in more detail. In order to facilitate the overall understanding in describing the present disclosure, the same reference numerals are used for the same components in a drawing and an overlapped description for the same components is omitted.

FIG. 1 is a diagram showing a feature map extraction and encoding process according to an embodiment of the present disclosure.

In an embodiment of the present disclosure, a process of extracting a feature map from an image, packing feature map information, encoding it and generating one or a plurality of bitstreams is described by referring to FIG. 1. A process shown in FIG. 1 may be performed by an image encoding device, a feature map encoding device, an image transmission device, etc. In describing this embodiment, for convenience of a description, it is assumed that it is performed by an image encoding device.

In reference to FIG. 1, an image encoding device may include an image preprocessor, a feature map extractor, a feature map information packing exerciser and a feature map information encoder. The above-described configurations included in an image encoding device may be implemented as an independent and separate configuration or may be implemented as a single configuration.

An image preprocessor may perform preprocessing such as color format transform, resolution adjustment, etc. of an input image. For example, an image preprocessor may selectively transform a color format of an image into RGB, YUV, etc.

A feature map extractor may receive an image to output a feature map of one or a plurality of feature pyramid networks. In other words, a feature map extractor may extract a feature map from an input image based on a feature pyramid network structure. A feature pyramid network represents a network which generates a plurality of feature maps with a multi-layer structure and a feature map generated from a feature pyramid network may have a different resolution or scale per each layer. A feature map generated from a feature pyramid network may be referred to as a pyramid feature map.

A feature map information packing exerciser may cluster a feature map of a feature pyramid network extracted from an image (i.e., a pyramid feature map) into one or a plurality of feature map groups. In addition, a feature map information packing exerciser may perform arrangement for a feature maps in a clustered feature map group.

FIG. 2 is a diagram illustrating a feature pyramid network structure according to an embodiment of the present disclosure.

In reference to FIG. 2, a pyramid feature map may be generated through a feature pyramid network as shown in FIG. 2. A feature pyramid network structure may be configured with a plurality of convolution layers (or layers) and may have the same structure as in an example of FIG. 2. As an example, when a size of an input image is (H×W) and a layer of a pyramid feature map is n, a size of a n-th pyramid feature map may be $$\left(\frac{H}{2^n} \times \frac{W}{2^n}\right).$$

In this case, a scope of n may be 0≤n<N and N may mean the total number of layers of a feature pyramid network.

An example of FIG. 2 is an example of a feature pyramid network structure with N=4 and N may be changed according to the number of convolution layers. In a process of extracting a pyramid feature map per layer (per layer), a sum operation with a pyramid feature map of a lower layer may be performed to generate a pyramid feature map of a higher layer. As an example, upsampling for a pyramid feature map of the lower layer may be performed before the sum operation. A n-th pyramid feature map may be referred to as a higher layer compared to a n+1-th pyramid feature map. The highest layer may be a 0-th pyramid feature map in FIG. 2. A feature map of the highest layer may be a feature map with the relatively highest resolution or scale.

As described above, due to a characteristic of a feature pyramid network, a multi-resolution feature map is output per layer for one image, so the amount of data which should be transmitted to a reception edge (or a reception end) may increase.

Accordingly, in an embodiment of the present disclosure, a method for improving the above-described problem is proposed by selectively transmitting a pyramid feature map and performing prediction for an untransmitted pyramid feature map. Due to a sum operation in the above-described feature pyramid network, redundancy between layers of a pyramid feature map may exist. A pyramid feature map may be selectively transmitted and prediction for an untransmitted pyramid feature map may be effectively performed based on this redundancy.

In an embodiment, index information on a feature map which will be transmitted to a reception edge may be transmitted in a feature map group header. An index assigned to a pyramid feature map to indicate a feature map to be transmitted may be configured as in Table 1. Alternatively, index information on a feature map which is not transmitted to a reception edge may be transmitted through a feature map group header. In a feature map group header, information on a feature map which will be transmitted (or a feature map which will not be transmitted) from a transmission edge (or a transmission end) may be transmitted in a unit of an image or a video. In addition, an index of a feature map to be transmitted (or an untransmitted feature map), a channel size of a corresponding feature map, a decoder type, etc. may be transmitted through a feature map group header.

TABLE 1

| Index | Feature Map |
|---|---|
| 0 | The 0-th Pyramid Feature Map |
| 1 | The 1-th Pyramid Feature Map |
| 2 | The 2-th Pyramid Feature Map |
| 3 | The 3-th Pyramid Feature Map |
| ... | ... |
| N-1 | The N-1-th Pyramid Feature Map |

A feature map to be transmitted may be arranged in ascending or descending order of a feature map index and a channel index and packed in a two-dimensional form. In this case, a feature map arrangement method may be transmitted through a feature map group header.

A feature map information encoder may perform encoding by selecting an encoder type which will encode a feature map of a feature pyramid network. A type of an encoder which may be selected may be transmitted through a feature map group header. An encoder may include a prediction and transform combination structure encoder (e.g., VVC, HEVC), a neural network-based encoder, etc. An encoder type may be directly determined by a user or may be selected by considering the performance and bit rate of a machine task.

FIG. 3 is a diagram showing a feature map reconstruction process according to an embodiment of the present disclosure.

In an embodiment of the present disclosure, reconstruction or decoding of a feature map may be performed as shown in FIG. 3. A process shown in FIG. 3 may be performed by an image decoding device, an image reconstruction device, a feature map decoding device, a feature map reconstruction device, an image display device, etc. In describing this embodiment, for convenience of a description, it is assumed that it is performed by an image decoding device.

In reference to FIG. 3, an image decoding device may include a feature map decoder, a feature map inverse packing exerciser, a pyramid feature map image quality improvement network and a pyramid feature map prediction network. The above-described configurations included in an image decoding device may be implemented as an independent and separate configuration or may be implemented as a single configuration.

An image decoding device may decode a received bitstream with one or a plurality of pyramid feature maps and reduce compression damage of a feature map through a pyramid feature map image quality improvement network and may finally reconstruct a pyramid feature map by generating an untransmitted pyramid feature map through a prediction network.

A feature map information decoder may decode a transmitted bitstream and output one or a plurality of feature map groups. A feature map group may include a plurality of pyramid feature maps. As an example, a feature map information decoder may parse an index of a decoder type in a feature map group header and decode a bitstream by using a corresponding decoder. In addition, a feature map information decoder may obtain index information on a pyramid feature map which is transmitted (or which is not transmitted) from a feature map group header to a reception edge from a bitstream. In the present disclosure, a pyramid feature map which is not transmitted to the reception edge may be referred to as a feature map that signaling is skipped or a skipped feature map.

A feature map inverse packing exerciser may be a process of separating a feature map group packed in a feature map encoding process into one or a plurality of feature maps of a feature pyramid network. When a data type in a feature map group is a feature map of a feature pyramid network, inverse arrangement may be performed after separating a feature map group into feature maps by using the number of channels and data arrangement method information of a corresponding feature map parsed in a feature map group header.

A pyramid feature map image quality improvement network may be a network which reduces compression damage which occurs in a pyramid feature map in an encoding/decoding process. An encoder may encode a pyramid feature map extracted from a network with a feature pyramid network-based structure and transmit a bitstream to a decoder. Alternatively, an image quality improvement process may be performed (or applied) to a pyramid feature map received from a decoder.

In an embodiment, for a pyramid feature map, only a pyramid feature map of a specific layer may be selectively transmitted. An image decoding device may decode a received bitstream, parse an index of a feature map transmitted in a feature map group header and perform decoding for a pyramid feature map corresponding to a parsed index. And, a decoded pyramid feature map may be input into a pyramid feature map image quality improvement network.

In another embodiment, an index for an untransmitted pyramid feature map may be signaled. In the present disclosure, for a feature map (a pyramid feature map) which is not transmitted to a reception edge, an image decoding device may decode the remaining feature maps excluding an untransmitted pyramid feature map and input a result thereof to a pyramid feature map image quality improvement network.

In addition, a pyramid feature map output from an image quality improvement network may be input to a pyramid feature map prediction network. A process therefor is described later in FIG. 6.

FIG. 4 is a block diagram for describing a pyramid feature map image quality improvement network according to an embodiment of the present disclosure.

In reference to FIG. 4, one or a plurality of decoded pyramid feature maps may be reconstructed into a pyramid feature map that compression damage is reduced through a pyramid feature map image quality improvement network. In the present disclosure, a pyramid feature map image quality improvement network may be referred to as a feature map image quality improvement network or an image quality improvement network.

Pyramid feature maps received from an encoder may be input to a pyramid feature map image quality improvement network by performing a concatenation operation. When a feature map with a different resolution is input to a pyramid feature map image quality improvement network, a concatenation operation may be performed after upsampling or downsampling is performed for a pyramid feature map in the same size.

A convolution neural network may be configured with convolution layers configured with two or more 9×9-sized kernels. As shown in FIG. 4, a GDN unit which applies an activation function GDN (Generalized Divisive Normalization) may be inserted between convolution layers. GDN is a normalization technology which may transform or inversely transform data of various distributions in a form of normal distribution. GDN may be performed based on Equation 1 below.

$$u_i^{(k+1)}(m, n) = \frac{w_i^{(k)}(m, n)}{\left(\beta_{k,i} + \sum_j \gamma_{k,i,j}\left(w_j^{(k)}(m, n)\right)^2\right)^{\frac{1}{2}}} \quad \text{[Equation 1]}$$

In reference to Equation 1, a value input to a k-th GDN activation function is three-dimensional data output from a k-th convolution layer, and may be expressed as $w_i^{(k)}(m,n)$ through m, n and i in order of a width, a height and a channel, respectively. A value output from a k-th activation function may be expressed as $u_i^{(k)}(m,n)$ and an output value may be input to a K+1-th convolution layer. In output of each K-th activation function, $w_i^{(k)}(m, n)$ positioned at m and n may be a process that $\beta_{k,i}$, a learning variable for a i channel of a k-th activation function, and $\gamma_{k,i,j}$, a learning variable for a i channel and a j channel of a K-th activation function, work and are output as $u_i^{(k)}(m,n)$.

In an embodiment, output of a feature map image quality improvement network may be a feature map that preprocessing is performed by a feature map preprocessor and a feature map that an element-wise summation operation is performed for final output of a convolution neural network.

A process of training a pyramid feature map image quality improvement network may be as follows. A loss function of a neural network may be a mean square error or a cross entropy error. A feature map which is encoded/decoded by a prediction/transform combined structure-based encoder/decoder or a neural network-based encoder/decoder for a pyramid feature map may be used as input (or an input image, a training image or training data) and an original pyramid feature map that compression damage is not included may be selected as a correct answer (or a target or target output) to learn an image quality improvement network. The above-described learning or training may include a process of updating weights of an image quality improvement network until input of an image quality improvement network matches a correct answer or generates output which approximates it by a predefined figure.

In an embodiment, output in a pyramid feature map image quality improvement network may be input to a pyramid feature map prediction network. A pyramid feature map prediction network may be a network which generates (or predicts) a feature map which is not received from a transmission edge by using a feature map of an adjacent layer with redundancy between pyramid feature map layers. It is described by referring to drawings below.

FIG. 5 is a block diagram for describing a pyramid feature map prediction network according to an embodiment of the present disclosure.

In reference to FIG. 5, a pyramid feature map which is not transmitted from a transmission edge may be generated (or predicted) through a pyramid feature map prediction network. In the present disclosure, a pyramid feature map prediction network may be referred to as a feature map prediction network or a prediction network.

As an embodiment, a pyramid feature map reconstructed through a pyramid feature map image quality improvement network may be input to a pyramid feature map prediction network. An upsampling or downsampling operation may be performed so that an input pyramid feature map and a pyramid feature map to be generated have the same resolution. A convolution neural network may be configured with convolution layers configured with two or more 9×9-sized kernels and may be generated by inserting an activation function GDN (or GDN unit) between convolution layers. Output of a pyramid feature map prediction network may predict and output a pyramid feature map at an untransmitted resolution (or layer or scale).

A process of training a pyramid feature map prediction network may be as follows. A loss function of a neural network may be a mean square error or a cross entropy error. A feature map which is encoded/decoded by a prediction/transform combined structure-based encoder/decoder or a neural network-based encoder/decoder for a pyramid feature map may be used as input (or an input image, a training image or training data) and an original pyramid feature map that compression damage is not included may be selected as a correct answer (or a target or target output) to learn a prediction network.

For example, when a n-th pyramid feature map is not transmitted and a n+1-th pyramid feature map, a n+2-th pyramid feature map and a n+3-th pyramid feature map are transmitted, a n+1-th pyramid feature map, a n+2-th pyramid feature map and a n+3-th pyramid feature map that compression damage exists may be used as input of a network and a n-th pyramid feature map without compression damage may be selected as a correct answer to learn a network. The above-described learning or training may include a process of updating weights of a prediction network until input of a prediction network matches a correct answer or generates output which approximates it by a predefined figure.

An encoder (or a transmission edge) may selectively transmit only a feature map of a specific layer to a decoder (or a reception edge) among pyramid feature maps generated in a pyramid feature map network. In other words, only some feature maps of pyramid feature maps may be selectively transmitted according to an embodiment.

FIG. 6 is a diagram illustrating a pyramid feature map prediction process according to an embodiment of the present disclosure.

FIG. 6 is an example of a process of generating a feature map by using a feature map prediction network when an encoder does not transmit some feature maps. For example, when a n-th pyramid feature map and a n+2-th pyramid feature map are not transmitted and a n+1-th pyramid feature map and a n+3-th pyramid feature map are transmitted, a n-th pyramid feature map and a n+2-th pyramid feature map may be generated.

In generating a n+2-th pyramid feature map required to generate a n-th pyramid feature map, a feature map may be generated by a method in FIG. 6-1 or FIG. 6-2 according to which pyramid feature map will be used.

FIG. 6-1 is an example of generating a n+2-th pyramid feature map by using only a n+3-th pyramid feature map when a n+2-th pyramid feature map is generated. A n+3-th pyramid feature map may be used as input of a pyramid feature map prediction network to generate a n+2-th pyramid feature map. In this case, upsampling may be performed for a n+3-th pyramid feature map. Subsequently, upsampling may be performed so that a generated n+2-th pyramid feature map, a reconstructed n+1-th pyramid feature map and a n+3-th pyramid feature map have the same size as a n-th pyramid feature map. A concatenation operation may be performed for each upsampled pyramid feature map and it may be input to a network to generate a n-th pyramid feature map. In an embodiment, as the n-th pyramid feature map is a feature map of the highest layer, it may be a final feature map which is finally obtained.

FIG. 6-2 is an example of generating a n+2-th pyramid feature map by using a n+1-th pyramid feature map and a n+3-th pyramid feature map when a n+2-th pyramid feature map is generated. Element-wise weighted-summation may be performed for a feature map which downsamples a n+1-th pyramid feature map and a feature map which upsamples a n+3-th pyramid feature map to generate a n+2-th pyramid feature map. The following Equation 2 may be used to generate a n+2-th pyramid feature map by performing element-wise weighted-summation for a n+1-th pyramid feature map and a n+3-th pyramid feature map.

$$p_{n+2}[H][W] = \alpha * p_{n+1}[H][W] + (1 - \alpha) * p_{n+3}[H][W] \quad \text{[Equation 2]}$$

(0≤H<Height, 0≤W<Width)

$p_{n+2}$ is a n+2-th pyramid feature map and a may be configured as a weight within a scope of [0,1]. H is a height of a corresponding feature map and W represents a width of a corresponding feature map.

Subsequently, upsampling may be performed so that a generated n+2-th pyramid feature map, a reconstructed n+1-th pyramid feature map and a reconstructed n+3-th pyramid feature map have the same size as a n-th pyramid feature map. A concatenation operation may be performed for each upsampled pyramid feature map and it may be input to a network to generate a n-th pyramid feature map. In an embodiment, as the n-th pyramid feature map is a feature map of the highest layer, it may be a final feature map which is finally obtained.

Meanwhile, an image analysis method according to this embodiment may be implemented in a form of a program instruction which may be executed through a variety of computer means and recorded in a computer-readable medium. The computer readable medium may include a program instruction, a data file, a data structure, etc. alone or in combination. A program instruction recorded in a computer readable medium may be specially designed and configured for the present disclosure or may be available by being notified to those skilled in a computer software art.

An example of a computer-readable medium includes a hardware device which is specially configured to store and execute a program instruction such as ROM, RAM, flash memory, etc. An example of a program instruction includes not only a machine language code as generated by a compiler, but also a high-level language code which may be executed by a computer with an interpreter, etc. The above-described hardware device may be configured to operate with at least one software module to perform an operation of the present disclosure and vice versa.

As above, this embodiment provides a method of configuring a deep neural network structure for analyzing three-dimensional image data. A virtual three-dimensional deep neural network structure according to this embodiment may be used to analyze three-dimensional image data including diagnosing a disease in an input medical image, locating a lesion or recognizing a human behavior in a video.

Although it was described above by referring to a desirable embodiment of the present disclosure, a person skilled in the relevant field of technology may understand that the present disclosure may be modified and changed in various ways within a scope without departing from an idea and a field of the present disclosure set forth in the claims below.

What is claimed is:

1. A method for decoding a neural network-based feature map, the method comprising:
    decoding a feature map group from a bitstream; wherein the feature map group includes remaining feature maps excluding a skipped feature map for which signaling is skipped and each of the skipped feature map and the remaining feature maps has a different resolution in one hierarchical structure;
    performing inverse packing for the decoded feature map group to obtain remaining feature maps;
    generating the skipped feature map based on at least one feature map among the remaining feature maps; and
    reconstructing a final feature map based on the remaining feature maps and the skipped feature map.

2. The method of claim 1,
    wherein decoding the feature map group includes decoding feature map group header information from the bitstream, and
    wherein the feature map group header information includes at least one of index information for indicating each of the remaining feature maps, channel size information of the remaining feature maps or encoder type information used for encoding of the remaining feature maps.

3. The method of claim 2,
    wherein the feature map group header information further includes at least one of channel number information or data arrangement method information of the remaining feature maps.

4. The method of claim 3,
    wherein obtaining the remaining feature maps performs inverse packing for the feature map group by performing inverse arrangement by separating data that a feature map index is arranged and two-dimensionally packed in pre-defined order in the feature map group into a plurality of feature maps based on at least one of the channel number information or the data arrangement method information.

5. The method of claim 1,
    wherein the skipped feature map is generated by performing upsampling for a feature map of an adjacent lower layer of the skipped feature map among the obtained remaining feature maps.

6. The method of claim 1,
    wherein generating the skipped feature map includes:
    performing upsampling for a feature map of a lower layer adjacent to the skipped feature map among the remaining feature maps;
    performing downsampling for a feature map of a higher layer adjacent to the skipped feature map among the remaining feature maps; and
    performing element-wise weighted-summation for the upsampled feature map of the adjacent lower layer and the downsampled feature map of the adjacent higher layer.

7. The method of claim 1,
    wherein generating the skipped feature map is performed by using a feature map prediction network including a convolution layer and a generalized divisive normalization (GDN) layer.

8. The method of claim 1,
    wherein reconstructing the final feature map includes:
    performing upsampling for each of the remaining feature maps and the skipped feature map to have the same resolution as the final feature map; and
    performing a concatenation operation for the upsampled remaining feature maps and the upsampled skipped feature map.

9. The method of claim 1,
    wherein the method further includes performing image quality improvement for at least one feature map among the remaining feature maps,
    wherein the skipped feature map is generated by using the feature map that the image quality improvement is performed.

10. The method of claim 9,
    wherein the image quality improvement is performed by using a feature map image quality improvement network including a convolution layer and a generalized divisive normalization (GDN) layer.

11. An apparatus for processing a neural network-based signal, the apparatus comprising:
    a processor which controls the apparatus; and
    a memory which is combined with the processor and stores data,
    wherein the processor:
    decodes a feature map group from a bitstream, wherein the feature map group includes remaining feature maps excluding a skipped feature map and each of the skipped feature map and the remaining feature maps has a different resolution in one hierarchical structure;
    performs inverse packing for the feature map group to obtain the remaining feature maps;
    generates a skipped feature map that signaling is skipped based on at least one feature map among the remaining feature maps; and
    reconstructs a final feature map based on the remaining feature maps and the skipped feature map.

* * * * *